Figure 1:
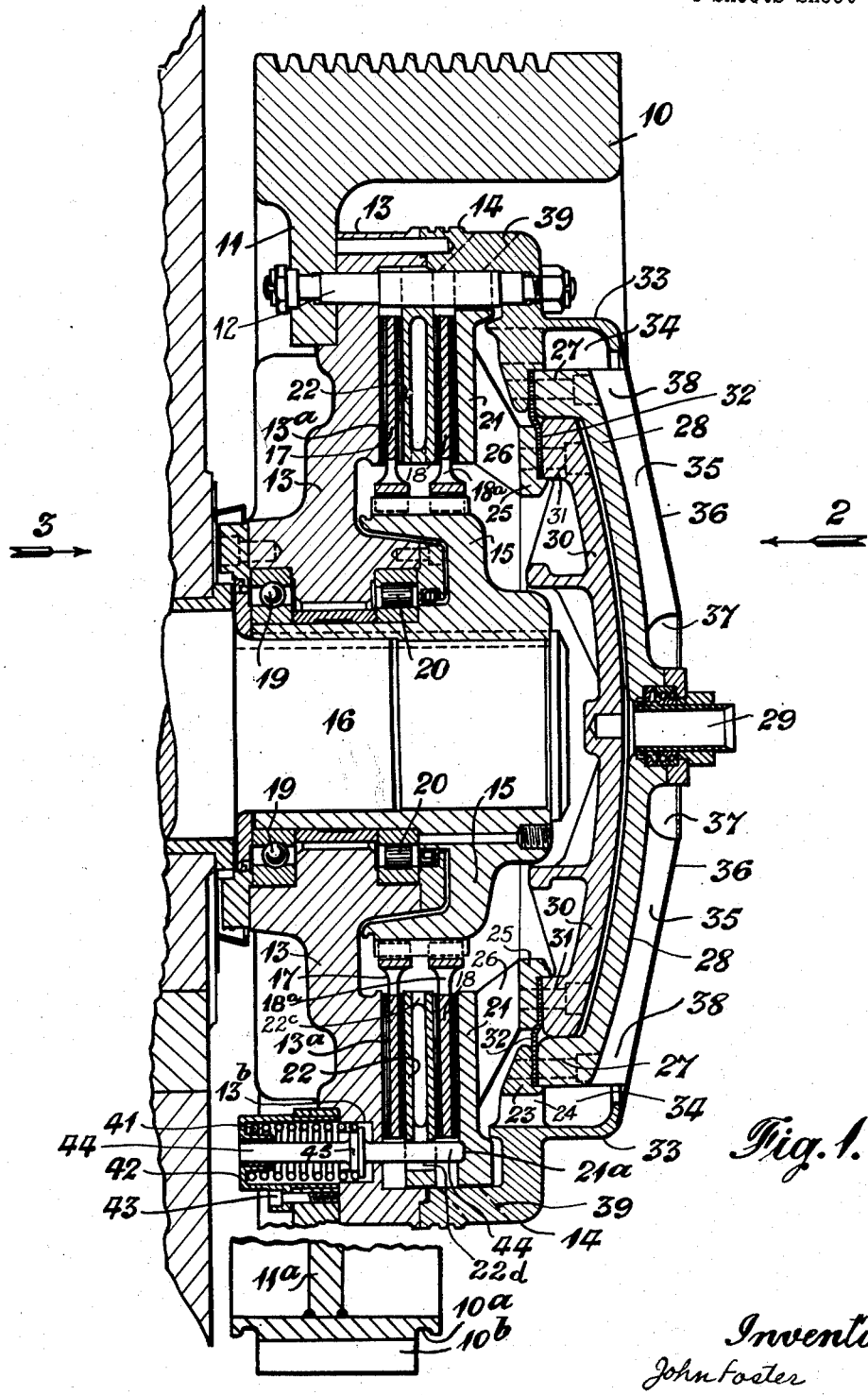

April 13, 1954     J. FOSTER     2,675,106
AIR COOLED FLUID CLUTCH
Filed Nov. 3, 1950     4 Sheets-Sheet 1

Inventor:-
John Foster
By his Attorneys:- Pennie, Edmonds, Morton and Barrows

Inventor:
John Foster

April 13, 1954   J. FOSTER   2,675,106
AIR COOLED FLUID CLUTCH
Filed Nov. 3, 1950   4 Sheets-Sheet 4

INVENTOR:—
John Foster

BY HIS ATTORNEYS:— Pennie, Edmonds Morton Barrows & Taylor

Patented Apr. 13, 1954

2,675,106

UNITED STATES PATENT OFFICE 2,675,106

AIR COOLED FLUID CLUTCH

John Foster, Denton, Manchester, England, assignor to B. & S. Massey Limited, Openshaw, Manchester, England Application November 3, 1950, Serial No. 193,860

Claims priority, application Great Britain June 30, 1950

3 Claims. (Cl. 192—113)

This invention in an air-cooled fluid clutch relates more particularly to fluid-actuated heavy duty clutch and flywheel assemblies and to means for cooling the inter-engaging friction clutch members of such clutches.

The invention has for its object a construction of a friction clutch and flywheel which provides for cooling of the hottest part of the clutch, i. e., the central friction plate or friction plates; which provides a sinuous passage for the cooling air giving a maximum area of contact of cooling air inside the clutch housing; which provides for cooling the sealing diaphragm between the operating cylinder and piston in which the cooling air is admitted through a cowling so enabling a maximum amount of centrifugal head to be obtained, and which provides simplified means for admitting operating fluid through the centre of the operating cylinder, so allowing use of full piston area, and avoiding use of annular type pistons.

The invention provides an air cooled fluid-actuated heavy duty friction clutch and flywheel assembly comprising a driven shaft and a rotatable flywheel, a housing attached to said flywheel providing a hub mounted on anti-friction bearings axially spaced along said shaft, inter-engaging outer and inner friction clutch members respectively carried by said housing and said shaft, a fluid pressure piston attached to an apertured extension of the outer friction clutch member remotest from the flywheel, a cylinder receiving said piston and attached to said housing, means for admitting pressure fluid at the axis of the cylinder for operating said piston to engage said clutch, spring means for returning said piston to initial position to disengage said clutch, the intermediate outer clutch member, or each intermediate outer clutch member, when more than one is used being in the form of a hollow disc having radially spaced chambers therein communicating with the interior of the clutch and with atmosphere through ports in the outer wall of the housing, the inner clutch members attached to the shaft also having apertures adjacent to their inner peripheries, a dish-shaped cowling secured around its circumference to the outer face of the clutch housing and its central part surrounding the axial boss of said cylinder through which operating fluid is led, the outer wall of said cylinder being formed with radial ribs which in conjunction with the said cowling, provide radial air passages communicating with atmosphere by way of an air inlet opening whereby cooling air may be centrifuged through the interior of the clutch.

In a practical embodiment of one construction of clutch according to the invention now to be described there is secured to the web of the flywheel proper one part of the clutch housing hereinafter referred to as the inner part, formed with a hub mounted on anti-friction bearings axially spaced along a shaft to be driven. Located between the said inner part of the housing and an outer part bolted thereto are inter-engaging friction clutch members, the inner clutch members being carried by the shaft and the outer clutch members by the clutch housing. The outer clutch member remote from the flywheel is formed with an apertured extension providing a flange for attachment of a piston slidable in a cylinder bolted to an apertured annulus in the outer part of the clutch housing and adapted to be supplied with pressure fluid through an axial apertured boss, said piston and cylinder being sealed off from the interior of the clutch housing by a flexible diaphragm interposed between the aforesaid flange and the piston and the aforesaid annulus and the cylinder. The outer casing is formed with an annular canopy surrounding but spaced apart from the circumference of the operating cylinder, the outer cover of the said cylinder being formed with a plurality of radially spaced ribs. A dish-shaped cowling is attached at its periphery to the aforesaid canopy and is formed with an aperture at its central part where it surrounds the boss of the operating cylinder, said cowling in conjunction with the radial ribs on the cylinder cover providing a multiplicity of radial passages forming communication between the inner part of the clutch housing and atmosphere whereby cooling air may be centrifuged through the interior of the clutch and out through radial ports in the periphery of the clutch housing.

This arrangement of the cowling provides, in conjunction with the radial ribs on the cylinder cover, a centrifugal impeller with a centrally disposed air inlet whereby directional flow of air into the clutch is effected.

In the rotation of the assembly cooling air enters the inlet ports in the cowling and is centrifuged through the radial passages between the cylinder cover and the cowling and passes through the apertures in the annulus of the outer housing and through the apertures in the extension of the outer friction plates to which the piston is connected cooling the diaphragm in its passage to the interior of the clutch housing and also the outer friction plate. The cooling air is then centrifugally induced through the intermediate clutch member to cool said member and escapes to atmosphere via the ports in the periphery of the outer clutch housing.

It will be seen that cooling air is centrifugally induced past the outer clutch member and cools those parts of the clutch in which the greatest heat is engendered in the working of the clutch.

Figure 2:
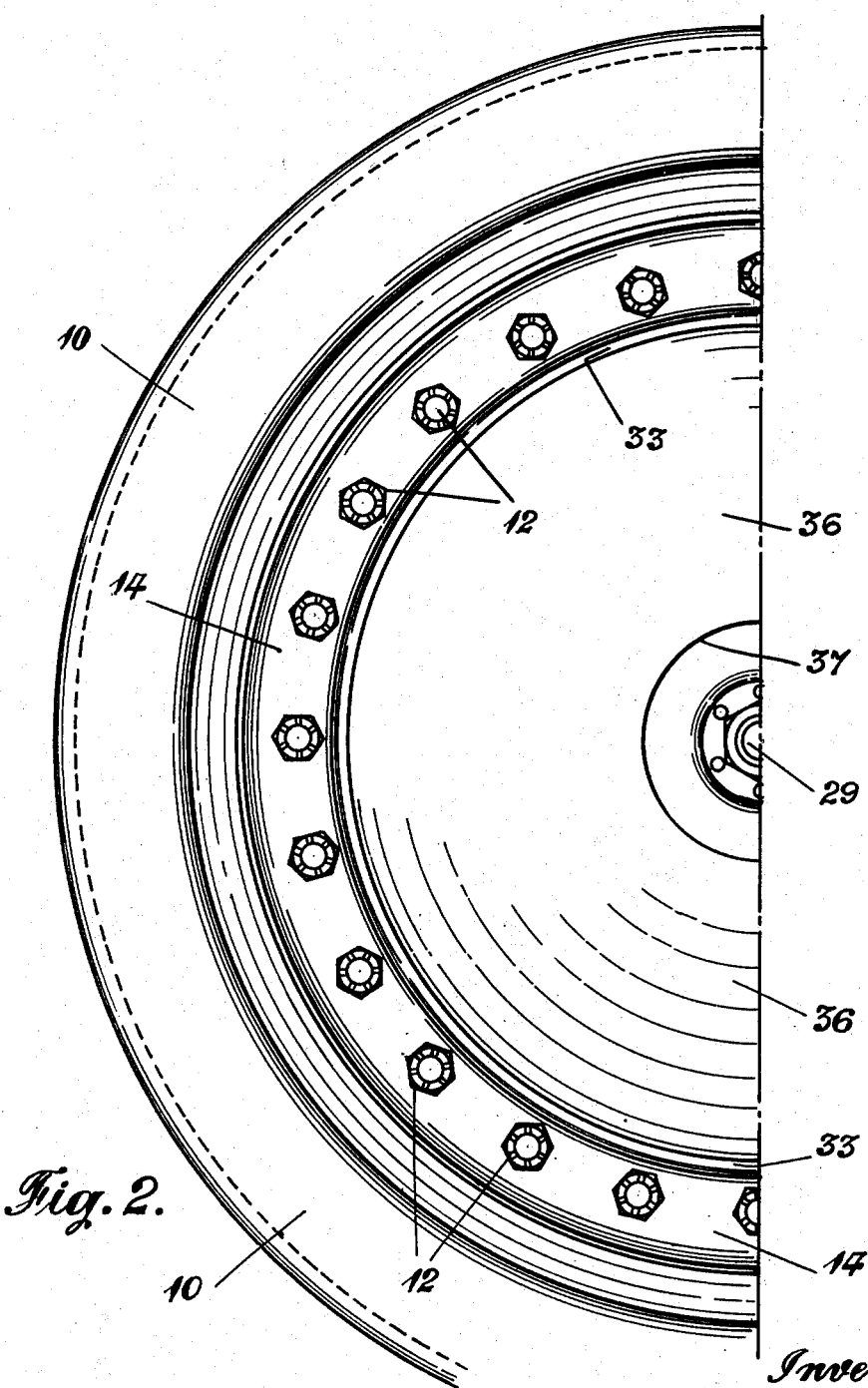
Figure 3:
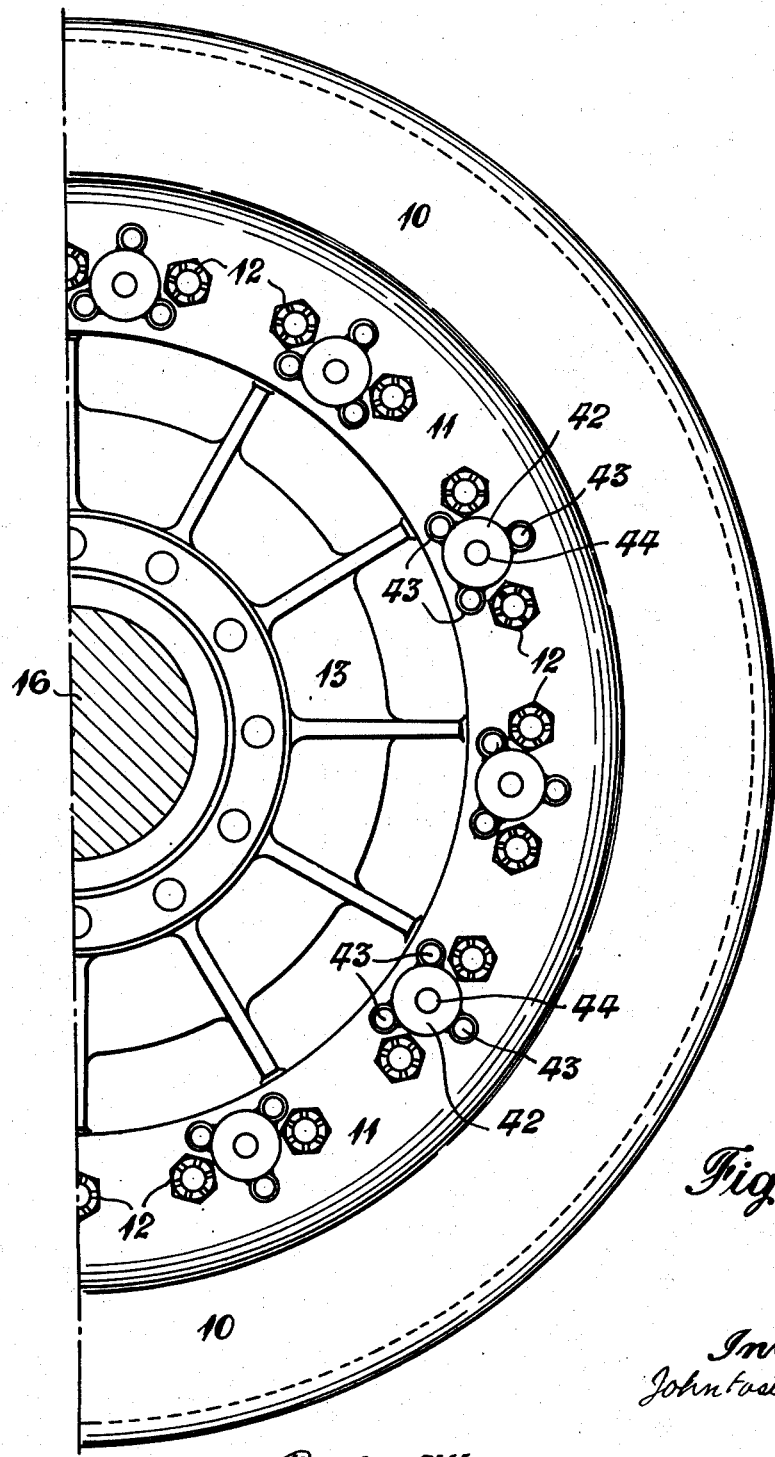
Figure 4:
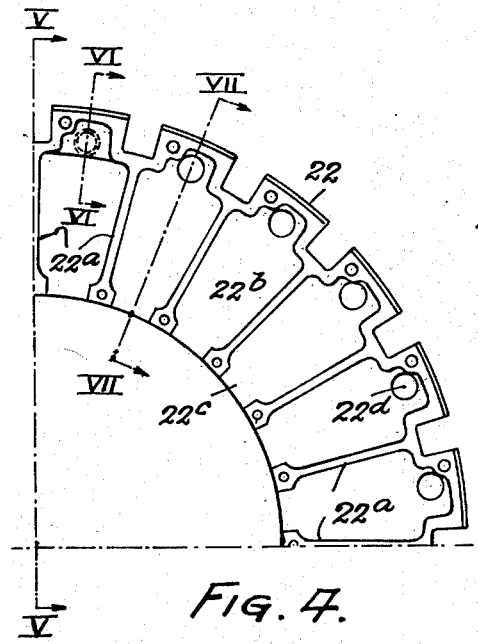
Figure 5:
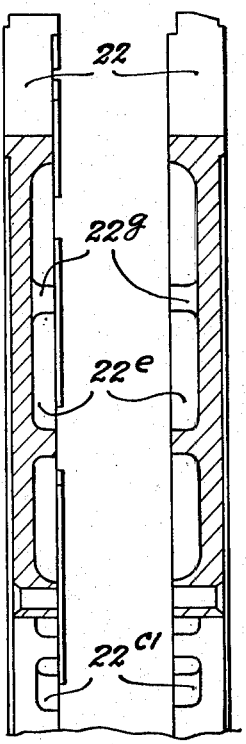
Figure 9:
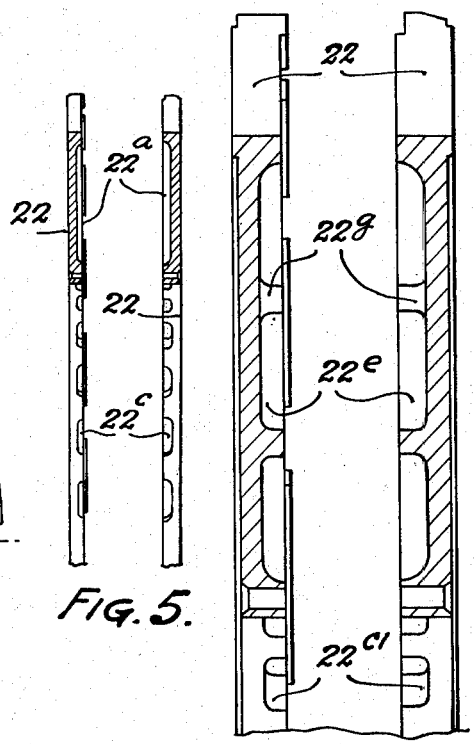
Figure 8:
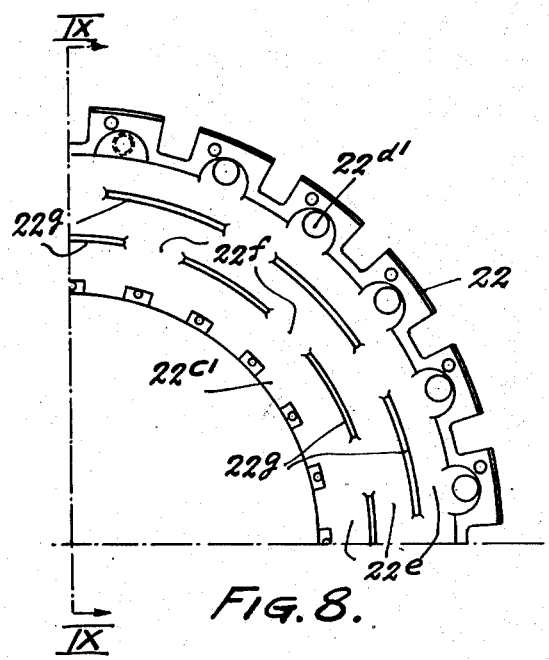
Figures 6, 7:
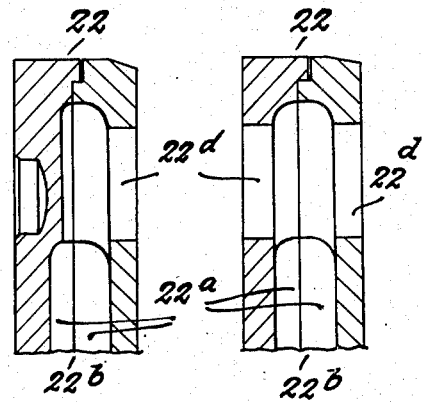

The invention will now be described with the aid of the accompanying drawings, in which Fig. 1 is a fragmentary sectional view of a clutch and flywheel assembly constructed according to the invention; Fig. 2 is a front view of Fig. 1, in the direction of the arrow A; Fig. 3 is a rear view of Fig. 1, in the direction of the arrow B; Fig. 4 is a fragmentary view showing the inner face of one of the two plates which together form the intermediate clutch member shown in Fig. 1, in its preferred form, and hereafter referred to as the intermediate driving plate; Fig. 5 is a vertical sectional view through the line V—V of Fig. 4, but showing both of the cooperating plates; Fig. 6 is a fragmentary sectional view, drawn to a larger scale, taken through the line VI—VI of Fig. 4; Fig. 7 is a similar view taken through the line VII—VII of Fig. 4; Fig. 8 is a fragmentary view showing the inner face view of one of the two plates which together form a modified construction of the intermediate driving plate; Fig. 9 is a fragmentary sectional view through the line IX—IX of Fig. 8, drawn to a larger scale, but showing both of the cooperating plates.

The same reference characters indicate corresponding parts in the several figures of the drawings.

Referring to the drawings, 10 indicates the flywheel, to the web 11 of which is secured by bolts 12 the clutch housing comprising inner and outer parts, 13, 14 respectively. 15 indicates the driven clutch member splined to the shaft 16 and furnished with driven plates 17, 18, splined to the member 15 and provided with friction surfaces. The driving clutch element is freely mounted on anti-friction bearings 19, 20, on an extending hub of the driven clutch member 15. 21 indicates the outer driving plate splined to the outer clutch housing 14. 22 indicates the intermediate driving plate in the form of a hollow disc which is splined to the clutch housing 13 forming part of the driving element.

Owing to difficulties of casting in steel and sand core removal the hollow intermediate driving plate is formed of two plates riveted or otherwise secured together and so formed on their adjacent inner faces as to provide passages for cooling air to pass therethrough and also to provide a maximum cooling area. In the preferred construction of the intermediate driving plate as shown in Figs. 1, 4, 5, 6 and 7, the hollow disc 22, Fig. 1, is formed of two plates riveted or otherwise secured together, each of the plates being formed with radial ribs 22ª extending from the inner periphery to the outer periphery. When the two plates are secured together with the ribs 22ª in contact radial passages 22ᵇ are formed. The passages 22ᵇ communicate at their inner ends via ports 22ᶜ with the interior of the clutch, and at their outer ends via ports 22ᵈ with outlet ports in the part 14 of the clutch housing.

The inner face 13ª of the clutch housing 13 forms a driving surface.

The outer part 14 of the clutch housing is formed with an internal annulus 23 having apertures 24.

The outer driving plate 21 is formed with an extension 25 having apertures 26.

Secured to the annulus 23 by bolts 27 is an operating cylinder 28 having a connection 29 which is piped to a supply of pressure fluid. A piston 30 slidable in the cylinder 28 is secured by bolts 31 to the extension 25 of the outer driving plate 21.

A flexible diaphragm 32 is interposed and nipped between the operating cylinder 28 and the annulus 23 and the piston 29 and the extension 25 to form an air seal.

The outer clutch housing 14 is formed with an annulus canopy 33 which surrounds the periphery of the operating cylinder 28 and forms a chamber 34 in communication with the interior of the clutch via the ports 24.

The outer wall of the cylinder 28 is provided with radial ribs 35.

Secured to the canopy 33 is a dish-shaped cowling 36 formed at its central portion with an air inlet 37 and providing in conjunction with the ribs 35 radial air passages 38 through which cooling air is induced to flow by centrifugal action into the interior of the clutch through the apertures 24 and 26 the cooling air then passing through apertures 18ª in the inner driven plate 18 and via the ports 22ᶜ through the radial passages 22ᵇ, in the hollow intermediate driving plate 22, thence through the ports 22ᵈ, see Fig. 4, to finally escape to atmosphere through radial outlet ports 39 in the part 14 of the clutch housing. In its passage through the apertures 26 the air cools the outer driving plate 21 and also the flexible diaphragm 32, and in its passage through the hollow intermediate driving plate 22 the air cools the said driving plate and also the inner driven plates 17, 18.

The flywheel 10 may be formed around its periphery with V grooves, as shown in the upper part of Fig. 1, for a rope drive.

Alternatively, and as shown in the lower part of Fig. 1, the flywheel 10 may be substituted by a gear wheel 10ª formed with gear teeth 10ᵇ and be driven through a toothed gear pinion. 11ª indicates the web of the gear wheel 10ª.

The outer clutch plate 21 is returned to initial position by means of springs, one of which is indicated at 41, spaced around the clutch housing.

Each spring 41 is located in a housing 42 secured to the web of the flywheel by screws 43.

A pin 44 with a fixed collar 45 is slidably mounted at one end in the housing 42 and, projecting through one of the apertures 22ª in the intermediate clutch member 22, engages at its opposite end in a recess 21ª in the outer clutch member 21. The collar 45 of the pin 44 fits in a recess 13ᵇ in the adjacent wall of the clutch member 13.

When the clutch is engaged the pins 44 are moved by the clutch plate 21 to compress and charge the springs 41, and when the pressure is released to disengage the clutch said springs 41 expand and return the clutch plate 21 to initial position.

Similar spring means are provided for effecting separation of the intermediate plates.

In the modification shown in Figs. 8 and 9 the intermediate driving plate 22 is in the form of a hollow disc, formed of two plates riveted or otherwise secured together, having concentric chambers 22ᵉ communicating with one another by ports 22ᶠ formed in walls 22ᵍ bounding said chambers, the ports 22ᶠ in alternate walls 22ᵍ being staggered. The inner chamber in the said intermediate driving plate 22 communicates with the interior of the clutch housing by way of ports 22c′, while the outer chamber of said intermediate clutch member 22 communicates through ports 22d′ with atmosphere by way of the radial outlet ports 39 in the periphery of the part 14 of the clutch housing.

What I claim is:

1. An air cooled fluid actuated heavy duty friction clutch and flywheel assembly comprising a driven shaft and a rotatable flywheel, a housing attached to said flywheel providing a hub mounted on anti-friction bearings axially spaced along said shaft, a pair of spaced inner friction clutch members carried by said shaft, an outer friction clutch member carried by said housing interengaging the outer of said clutch members, an apertured extension on the outer friction clutch member, a fluid pressure piston attached to the apertured extension on the outer friction clutch member, a cylinder receiving said piston and attached to said housing, said cylinder being formed with an axial boss having means through which pressure fluid is admitted for operating said piston to engage said clutch members, spring means for returning said piston to its initial position to disengage the clutch, an intermediate outer clutch member located between the inner clutch members, said intermediate clutch member being in the form of a hollow disc having radially spaced chambers communicating by way of inlet ports with the interior of the clutch and by way of outlet ports with atmosphere through ports in the housing, said inner clutch members attached to the shaft also having apertures adjacent to their inner peripheries, a dish-shaped cowling secured around its circumference to the outer face of the clutch housing and arranged with its central part surrounding the axial boss of the operating cylinder and being there formed with an air inlet opening, said operating cylinder having radial ribs on its outer surface which in conjunction with the said cowling provide radial air passages communicating with atmosphere by way of the said air inlet opening and with the interior of the clutch by way of ports in the clutch housing whereby cooling air may be centrifuged through the interior of the clutch.

2. An air cooled fluid actuated heavy duty friction clutch and flywheel assembly as claimed in claim 1, characterized in that the means for admitting pressure fluid through the axial centre of the cylinder to operate said piston is so arranged as to permit use of the full piston area.

3. An air cooled fluid actuated heavy duty friction clutch and flywheel assembly as claimed in claim 1 in which the clutch housing includes an annulus canopy surrounding the periphery of the operating cylinder and to which the circumference of the dish-shaped cowling is secured, said annulus canopy and said cowling in conjunction with the radial ribs forming a centrifugal impeller whereby directional flow of air into the clutch is obtained.

References Cited in the file of this patent
UNITED STATES PATENTS

| Number | Name | Date |
| --- | --- | --- |
| 1,731,416 | Gurney | Oct. 15, 1929 |
| 1,759,755 | Lindner | May 20, 1930 |
| 2,095,094 | Glasner | Oct. 5, 1937 |
| 2,241,241 | Clouse | May 6, 1941 |
| 2,290,542 | Criley | July 21, 1942 |
| 2,348,025 | Peets et al. | May 2, 1944 |
| 2,487,936 | McCrady et al. | Nov. 15, 1949 |
| 2,581,637 | Danly et al. | Jan. 8, 1952 |